(12) United States Patent
Taylor et al.

(10) Patent No.: US 9,800,769 B2
(45) Date of Patent: *Oct. 24, 2017

(54) APPARATUS AND METHOD FOR AUTOMATIC VIDEO RECORDING

(71) Applicant: H4 Engineering, Inc., San Antonio, TX (US)

(72) Inventors: Scott K. Taylor, San Antonio, TX (US); Christopher T. Boyle, San Antonio, TX (US); Alexander G. Sammons, San Antonio, TX (US); Denes Marton, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,837

(22) Filed: May 14, 2015

(65) Prior Publication Data
US 2015/0249778 A1 Sep. 3, 2015

Related U.S. Application Data

(63) Continuation of application No. 14/291,213, filed on May 30, 2014, now Pat. No. 9,565,349, which is a
(Continued)

(51) Int. Cl.
| | | |
|---|---|---|
| G01S 1/00 | (2006.01) | |
| G01S 19/14 | (2010.01) | |
| G01S 3/785 | (2006.01) | |
| H04N 5/20 | (2006.01) | |
| H04N 5/232 | (2006.01) | |
| G01S 3/786 | (2006.01) | |

(52) U.S. Cl.
CPC .............. *H04N 5/232* (2013.01); *G01S 1/00* (2013.01); *G01S 3/785* (2013.01); *G01S 3/7864* (2013.01); *G01S 19/14* (2013.01); *H04N 5/23203* (2013.01)

(58) Field of Classification Search
None
See application file for complete search history.

(56) References Cited

U.S. PATENT DOCUMENTS

| | | |
|---|---|---|
| 720,975 A | 2/1903 | Schult |
| 3,469,148 A | 9/1969 | Lund |

(Continued)

FOREIGN PATENT DOCUMENTS

| | | |
|---|---|---|
| EP | 0660131 A | 6/1995 |
| EP | 1981278 A1 | 10/2008 |

(Continued)

OTHER PUBLICATIONS

Ecodrive03 Drive for General Automation With Fieldbus-Interface; 2000; Rexroth Indramat GmbH; pp. 224 and 278.
(Continued)

*Primary Examiner* — Reza Aghevli
(74) *Attorney, Agent, or Firm* — Volk & McElroy, LLP; Michael D. Volk, Jr.

(57) ABSTRACT

System and methods for pointing a device, such as a camera, at a remote target wherein the pointing of the device is controlled by a combination of location information obtained by global positioning technology and image recognition of the target.

11 Claims, 6 Drawing Sheets

Related U.S. Application Data continuation of application No. 13/782,862, filed on Mar. 1, 2013, now Pat. No. 8,749,634.

(60) Provisional application No. 61/605,604, filed on Mar. 1, 2012, provisional application No. 61/745,346, filed on Dec. 21, 2012.

(56) References Cited

U.S. PATENT DOCUMENTS

| | | | |
|---|---|---|---|
| 4,041,507 A | 8/1977 | Chan et al. | |
| 4,153,357 A | 5/1979 | Winnacker et al. | |
| 4,244,591 A | 1/1981 | Umetsu | |
| 4,645,347 A | 2/1987 | Rioux | |
| 4,683,729 A | 8/1987 | Rogers | |
| 4,814,711 A | 3/1989 | Olsen et al. | |
| 4,980,871 A | 12/1990 | Sieber et al. | |
| 5,073,824 A | 12/1991 | Vertin | |
| 5,363,297 A | 11/1994 | Larson et al. | |
| 5,430,473 A | 7/1995 | Beecher, II et al. | |
| 5,438,357 A | 8/1995 | McNelley | |
| 5,457,370 A | 10/1995 | Edwards | |
| 5,463,432 A | 10/1995 | Kahn | |
| 5,491,632 A | 2/1996 | Pawlak et al. | |
| 5,572,317 A | 11/1996 | Parker et al. | |
| 5,640,007 A | 6/1997 | Talbott et al. | |
| 5,668,629 A | 9/1997 | Parker et al. | |
| 5,764,786 A | 6/1998 | Kuwashima et al. | |
| 5,802,412 A | 9/1998 | Kahn | |
| 5,878,151 A | 3/1999 | Tang et al. | |
| 5,912,980 A | 6/1999 | Hunke | |
| 5,973,732 A | 10/1999 | Guthrie | |
| 6,002,428 A | 12/1999 | Matsumura et al. | |
| 6,014,167 A | 1/2000 | Suito et al. | |
| 6,031,568 A | 2/2000 | Wakitani | |
| 6,035,067 A | 3/2000 | Ponticos | |
| 6,075,557 A | 6/2000 | Holliman et al. | |
| 6,130,964 A | 10/2000 | Marques et al. | |
| 6,173,066 B1 | 1/2001 | Peurach et al. | |
| 6,188,777 B1 | 2/2001 | Darrell et al. | |
| 6,355,881 B1 | 3/2002 | Braeges et al. | |
| 6,400,903 B1 | 6/2002 | Conoval | |
| 6,519,860 B1 | 2/2003 | Bieg et al. | |
| 6,560,029 B1 | 5/2003 | Dobbie et al. | |
| 6,596,976 B2 | 7/2003 | Lin et al. | |
| 6,603,408 B1 | 8/2003 | Gaba | |
| 6,650,360 B1 | 11/2003 | Osen | |
| 6,690,978 B1 | 2/2004 | Kirsch | |
| 6,744,403 B2 | 6/2004 | Milnes et al. | |
| 6,751,409 B2 | 6/2004 | Nakamura | |
| 6,771,213 B2 | 8/2004 | Durst et al. | |
| 6,795,110 B1 | 9/2004 | Kossin | |
| 6,867,799 B2 | 3/2005 | Broemmelsiek | |
| 6,952,646 B2 | 10/2005 | Chang | |
| 6,972,787 B1 | 12/2005 | Allen et al. | |
| 7,050,712 B2 | 5/2006 | Shimamura | |
| 7,060,921 B2 | 6/2006 | Kubo | |
| 7,239,718 B2 | 7/2007 | Park et al. | |
| 7,239,975 B2 | 7/2007 | Coleman et al. | |
| 7,245,251 B2 | 7/2007 | Vogel et al. | |
| 7,349,008 B2 | 3/2008 | Rui et al. | |
| 7,365,771 B2 | 4/2008 | Kahn et al. | |
| 7,426,338 B2 | 9/2008 | Matsumoto et al. | |
| 7,450,835 B2 | 11/2008 | Lackey et al. | |
| 7,477,839 B2 | 1/2009 | Funahashi et al. | |
| 7,547,875 B1 | 6/2009 | Tsai et al. | |
| 7,557,825 B2 | 7/2009 | Ishii et al. | |
| 7,591,195 B2 | 9/2009 | Puzio | |
| 7,672,781 B2 | 3/2010 | Churchill et al. | |
| 7,751,696 B2 | 7/2010 | Tatamiya | |
| 7,855,638 B2 | 12/2010 | Huston | |
| 7,920,163 B1 | 4/2011 | Kossin | |
| 7,982,794 B2 | 7/2011 | Wernersson | |
| 8,170,277 B2 | 5/2012 | Michimoto et al. | |
| 8,253,792 B2 | 8/2012 | Wells et al. | |
| 8,953,117 B2 | 2/2015 | Rosenau et al. | |
| 9,071,740 B1 | 6/2015 | Duffy et al. | |
| 2001/0030856 A1 | 10/2001 | Wilson | |
| 2002/0005902 A1 | 1/2002 | Yuen | |
| 2002/0057217 A1 | 5/2002 | Milnes et al. | |
| 2002/0149681 A1 | 10/2002 | Kahn et al. | |
| 2003/0025614 A1 | 2/2003 | Kahn | |
| 2003/0103651 A1* | 6/2003 | Novak | G01C 11/02 382/106 |
| 2003/0214710 A1 | 11/2003 | Takahashi et al. | |
| 2004/0006424 A1 | 1/2004 | Joyce et al. | |
| 2004/0105010 A1 | 6/2004 | Osen | |
| 2004/0119716 A1 | 6/2004 | Park et al. | |
| 2004/0233461 A1 | 11/2004 | Armstrong et al. | |
| 2005/0014458 A1 | 1/2005 | Hung | |
| 2005/0083433 A1 | 4/2005 | Wishart et al. | |
| 2005/0134458 A1 | 6/2005 | Leyden et al. | |
| 2005/0174084 A1 | 8/2005 | Nakai et al. | |
| 2005/0201613 A1 | 9/2005 | Mostafavi | |
| 2005/0220448 A1 | 10/2005 | Tei et al. | |
| 2006/0045613 A1 | 3/2006 | Leyden et al. | |
| 2006/0077258 A1 | 4/2006 | Allen et al. | |
| 2006/0125928 A1 | 6/2006 | Wolcott et al. | |
| 2007/0019073 A1 | 1/2007 | Comaniciu et al. | |
| 2007/0039030 A1 | 2/2007 | Romanowich et al. | |
| 2007/0115358 A1 | 5/2007 | McCormack | |
| 2007/0146484 A1 | 6/2007 | Horton et al. | |
| 2007/0164905 A1 | 7/2007 | Lempkowski et al. | |
| 2007/0247615 A1 | 10/2007 | Bridges | |
| 2007/0252756 A1 | 11/2007 | Radin | |
| 2007/0291123 A1 | 12/2007 | Cole | |
| 2007/0292118 A1 | 12/2007 | Träff | |
| 2008/0001022 A1 | 1/2008 | Sa et al. | |
| 2008/0002031 A1 | 1/2008 | Cana et al. | |
| 2008/0015000 A1 | 1/2008 | Jung | |
| 2008/0062711 A1 | 3/2008 | Veenstra et al. | |
| 2008/0105527 A1 | 5/2008 | Leftly | |
| 2008/0136705 A1 | 6/2008 | Durst et al. | |
| 2008/0192116 A1 | 8/2008 | Tamir et al. | |
| 2008/0225137 A1 | 9/2008 | Kubo et al. | |
| 2008/0253140 A1 | 10/2008 | Fleischmann et al. | |
| 2008/0271220 A1 | 11/2008 | Chilton et al. | |
| 2008/0285803 A1 | 11/2008 | Madsen | |
| 2009/0028386 A1 | 1/2009 | Michimoto et al. | |
| 2009/0096871 A1 | 4/2009 | Kuwano et al. | |
| 2009/0096875 A1* | 4/2009 | Yoshimaru | G06F 17/30247 348/207.1 |
| 2009/0145371 A1 | 6/2009 | Kramer | |
| 2009/0154182 A1 | 6/2009 | Veenstra et al. | |
| 2009/0167867 A1 | 7/2009 | Lin et al. | |
| 2009/0206077 A1 | 8/2009 | Melmon et al. | |
| 2009/0267895 A1* | 10/2009 | Bunch | G06F 3/0386 345/157 |
| 2009/0300122 A1 | 12/2009 | Freer | |
| 2009/0322600 A1 | 12/2009 | Whitehead et al. | |
| 2010/0007555 A1 | 1/2010 | Ezal et al. | |
| 2010/0007582 A1 | 1/2010 | Zalewski | |
| 2010/0026809 A1 | 2/2010 | Curry | |
| 2010/0030856 A1 | 2/2010 | Blum et al. | |
| 2010/0052981 A1 | 3/2010 | Alexander et al. | |
| 2010/0092033 A1* | 4/2010 | Krishnaswamy | F41G 3/06 382/103 |
| 2010/0118149 A1 | 5/2010 | Levin et al. | |
| 2010/0149399 A1 | 6/2010 | Mukai et al. | |
| 2010/0176270 A1 | 7/2010 | Lau et al. | |
| 2010/0186214 A1 | 7/2010 | Judge | |
| 2010/0191651 A1 | 7/2010 | Irmscher et al. | |
| 2010/0201829 A1 | 8/2010 | Skoskiewicz et al. | |
| 2010/0238262 A1 | 9/2010 | Kurtz et al. | |
| 2010/0245532 A1 | 9/2010 | Kurtz et al. | |
| 2011/0019066 A1 | 1/2011 | Takano et al. | |
| 2011/0050878 A1 | 3/2011 | Wells et al. | |
| 2011/0090341 A1 | 4/2011 | Ikewada et al. | |
| 2011/0109554 A1 | 5/2011 | Boissier | |
| 2011/0163908 A1 | 7/2011 | Andersson et al. | |
| 2011/0187865 A1 | 8/2011 | Felt et al. | |
| 2011/0211820 A1 | 9/2011 | Yim | |
| 2011/0228098 A1 | 9/2011 | Lamb et al. | |
| 2011/0304736 A1 | 12/2011 | Evans et al. | |

(56) References Cited

U.S. PATENT DOCUMENTS

| | | | |
|---|---|---|---|
| 2011/0313653 A1* | 12/2011 | Lindner | G01C 21/3632 701/523 |
| 2012/0019645 A1 | 1/2012 | Maltz | |
| 2012/0038902 A1* | 2/2012 | Dotson | G01S 17/023 356/4.01 |
| 2012/0075482 A1* | 3/2012 | Voss | H04N 5/272 348/207.1 |
| 2012/0112347 A1 | 5/2012 | Eckhardt et al. | |
| 2012/0169865 A1 | 7/2012 | Tsai | |
| 2012/0218415 A1 | 8/2012 | Chun et al. | |
| 2012/0219271 A1 | 8/2012 | Vunic et al. | |
| 2012/0262618 A1 | 10/2012 | Weakly | |
| 2012/0269386 A1 | 10/2012 | Hankins et al. | |
| 2012/0321294 A1 | 12/2012 | Tages et al. | |
| 2013/0016960 A1 | 1/2013 | Yang | |
| 2013/0021486 A1 | 1/2013 | Richardson | |
| 2013/0027554 A1* | 1/2013 | Meadow | H04N 7/18 348/144 |
| 2013/0077931 A1 | 3/2013 | Cornell et al. | |
| 2013/0162852 A1 | 6/2013 | Boyle et al. | |
| 2013/0242080 A1 | 9/2013 | Kossin | |
| 2013/0278845 A1 | 10/2013 | Pishnyak et al. | |
| 2014/0152890 A1 | 6/2014 | Rayner | |
| 2014/0226062 A1 | 8/2014 | Parrill | |
| 2015/0077531 A1 | 3/2015 | Adair et al. | |

FOREIGN PATENT DOCUMENTS

| | | |
|---|---|---|
| GB | 2468177 A | 9/2010 |
| JP | H09113603 A | 5/1997 |
| JP | 2002229672 A | 8/2002 |
| JP | 2002314851 A | 10/2002 |
| JP | 2005020205 A | 1/2005 |
| JP | 2005167517 A | 6/2005 |
| JP | 2005295222 A | 10/2005 |
| JP | 2007312026 | 11/2007 |
| JP | 2008042522 A | 2/2008 |
| JP | 2008288151 A | 11/2008 |
| JP | 2009177666 A | 8/2009 |
| JP | 2010511111 A | 4/2010 |
| JP | 2011124746 A | 6/2011 |
| KR | 1019980043069 A | 8/1998 |
| KR | 100814096 B1 | 3/2008 |
| WO | 9517687 A | 6/1995 |
| WO | 0141428 A1 | 6/2001 |
| WO | 2008037127 A1 | 4/2008 |
| WO | 2008067278 A1 | 6/2008 |

OTHER PUBLICATIONS

Barwani et al., Vehicle Dynamics Lab GPS Tracking Camera Turret, web site, 2009, available at URL http://www.me.berkeley.edu/ME102B/Past.sub.--Proj/f09/17%20GPS%20Camera%2-0Turret%20Website/Home.html.

Clifford et al., Measuring Tilt with Low-g Accelerometers, Freescale Semiconductor Application Note, May 2005, Freescale Semiconductor, available at URL http://classes.cecs.ucf.edu/seecsseniordesign/su2006fa2006/g09/files/patr-ick/measuring%20tilt%20with%20low-g%20accelerometers.pdf.

Dana M. Sommer, Principles of GPS , Presentation Slides, date of publication unknown, available at URL des.memphis.edu/esra/../Principles%20of%20GPS/204-13-04.pdf.

E Calais, The Global Positioning System, Presentation Slides, available at date of publication unknown, available at URL web.ics.purdue.edu/.about.ecalais/teaching/geodesy/GPS.sub.--observables.-pdf.

Gibbings et al., Assessing the Accuracy and Integrity of RTK GPS Beneath High Voltage Power Lines, 2001—A Spatial Odyssey: 42nd Australian Surveyors Congress, date of publication unknown, available at URL eprints.usq.edu.au/2606/1/gibbings.pdf.

Kaplan et al., Understanding GPS Principles and Applications, book, 2006, Artech House, available at URL http://www.bdu.ac.inickr/uploads/Earth/GPS%20FULL%20All%20in%201.pdf.

Kimberly Tuck, Tilt Sensing Using Linear Accelerometers, Freescale Semiconductor Application Note, Jun. 2007, Freescale Semiconductor, available at URL http://www.mh-hannover.de/fileadmin/zentrale.sub.--einrichtungen/zentrale-forschungswerkst/downloads/AN3461.pdf.

Oncore, Chapter 2 GPS Principles, date of publication unknown, available at URL gpsd.berlios.de/vendor-docs/motorola/ch2.pdf.

Dr. Jacob Tal, Motion Control Made Easy, PT Design, p. 62, 64 (Oct. 2000).

* cited by examiner

APPARATUS AND METHOD FOR AUTOMATIC VIDEO RECORDING

CROSS-REFERENCE TO RELATED APPLICATIONS

This application is a continuation of U.S. Nonprovisional patent application Ser. No. 14/291,213, filed May 30, 2014, which application is a continuation of U.S. Nonprovisional patent application Ser. No. 13/782,862 filed Mar. 1, 2013 (now U.S. Pat. No. 8,749,634, issued Jun. 10, 2014), which application claims the benefit of U.S. Provisional Patent Application No. 61/605,604, filed Mar. 1, 2012, and U.S. Provisional Patent Application No. 61/745,346, filed Dec. 21, 2012, the contents all of which are incorporated herein by this reference and are not admitted to be prior art with respect to the present invention by the mention in this cross-reference section.

BACKGROUND

Recording a person participating in an activity is an important task. A surfer may wish to capture his surfing experience for later enjoyment or to improve his or her surfing technique. A father may wish to record his son's winning touchdown in a football game. A mother may wish to capture her daughter's record-breaking gymnastics performance. In these examples, the camera is typically, and sometimes for best results, relatively far away from the participant, or more generally, the subject. To record the subject, a second person is needed to control and position the camera. Because humans are imperfect, the quality of the recorded video may not be ideal. For example, the camera operator or cameraman may have an unsteady hand making the recorded video too shaky and unbearable to watch. Additionally, the cameraman may become tired or distracted and may not keep the subject in the view field of the camera. In this situation, the cameraman may fail to capture an exciting or interesting moment. Further, some subjects may not have a second person willing to operate the camera. In this case, the individual loses the chance to record him or herself.

SUMMARY OF THE INVENTION

In accordance with a preferred embodiment hereof, this invention provides a system for orienting a camera at a target, the system comprising global positioning units associated with the camera and the target and an orienting device capable of orienting the camera at the target based on location information generated by the global positioning units, wherein the system for orienting the camera receives images from the camera and is trained using the received images to recognize the target, and, once trained, uses image recognition to orient the camera at the target.

In accordance with another preferred embodiment hereof, this invention provides a method of pointing a camera at a target, the method comprising at least one first combination of steps and at least one second combination of steps, wherein the at least one first combination of steps comprises the steps of determining a location and an orientation of the camera; determining a location of the target; determining a direction and a distance between the camera and the target; periodically determining changes in the location of the target; periodically determining changes in orientation of the camera that are necessary to point the camera towards the target; using an orientation controller to point the camera towards the target; and wherein the at least one second combination of steps comprises the steps of collecting images of the target; training image recognition software to recognize the target within a field of view of the camera; orienting the camera at the recognized target; and wherein the at least one first combination of steps is used whenever the target is not recognized within the field of view of the camera.

In accordance with yet another preferred embodiment hereof, this invention provides a method of pointing a camera at a moving target, the method comprising the steps of determining locations of the camera and of the target using global positioning information; periodically repeating determining locations of the camera and of the target in real time using global positioning information; periodically determining directions between the camera and the target; determining an orientation of the camera; periodically repeating determining the orientation of the camera in real time; using image recognition software to determine characteristics of the target and storing the characteristics; and using the stored characteristics of the target to point the camera at the target.

This invention also provides each and every novel feature, element, combination, step, and/or method disclosed or suggested herein.

DETAILED DESCRIPTION OF THE PREFERRED EMBODIMENTS

Figure 1:
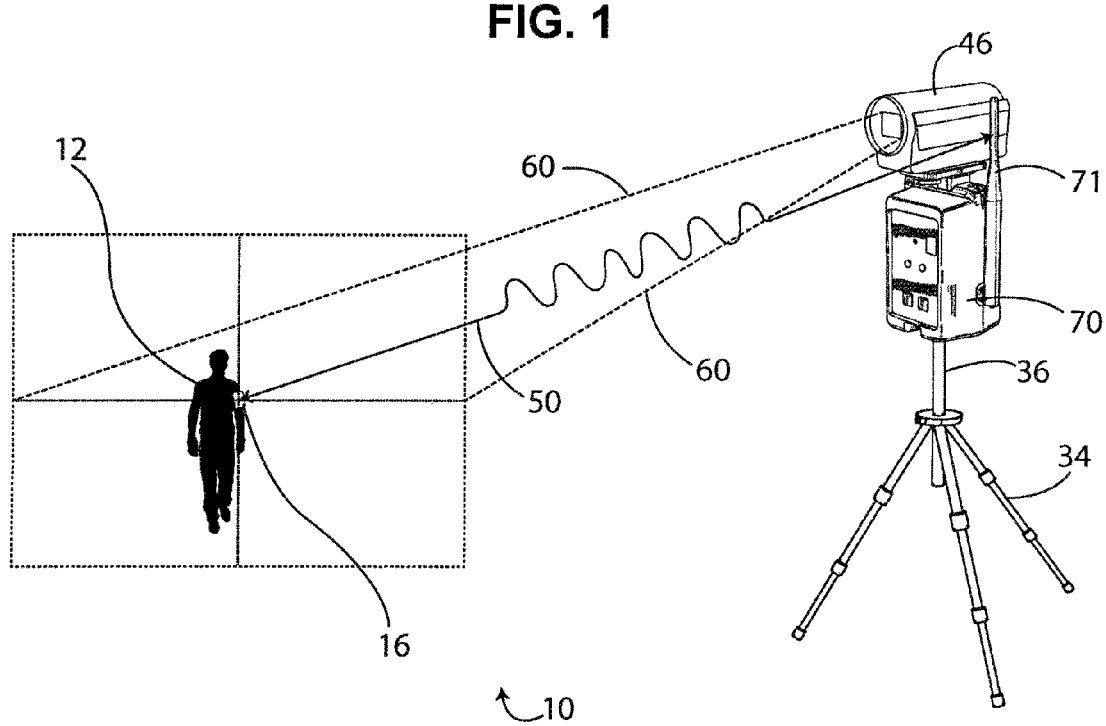
FIG. 1 shows a schematic diagram illustrating a first embodiment of an automatic video recording system according to a preferred embodiment of the present invention.

The systems and methods of the present invention relate to automatic orientation of a pointing device, such as a camera, at a target or subject wherein the pointing device is controlled based on a combination of location data obtained by satellite-based global positioning technology and orientation and/or location data obtained by line-of-sight technology. The line-of-sight techniques of the present invention may use, for example, orientation at a radiation source or sound source.

In the preferred embodiments hereof, an automatic video recording system records video footage during an activity such as, for example, surfing. The automatic video recording system automatically tracks a designated person engaged in the activity such that they remain substantially within the field of view of the camera without the need for engaging the services of a second person to operate the camera. For the purposes of the description hereof, the term "track" means to continually adjust the orientation of the camera so that the subject of the recording remains substantially in the field of view of the camera.

The systems and methods of the present invention further relate to one or more devices that point or orient one or more cameras to track and film one or more subjects. The systems hereof are capable of keeping the one or more cameras pointed at, or oriented towards, a desired subject for an extended period of time (such as during a surfing session, a soccer game, a ballroom dance competition, etc.). Certain available technologies and methods have limited range, response time, precision of location, and orientation determination. Specifically, global-positioning-based technology is normally limited to outdoor use and may have significant errors when used in the vicinity of bulky objects, such as buildings. Additionally, global-positioning-based technology also has response times of about one second, which may pose significant issues for tracking subjects that move at speeds of several feet per second. The systems and methods of the present invention combine line-of-sight technology with global positioning to achieve faster response times and increased tracking precision.

In the following discussion, two main types of embodiments using line-of-sight methods will be discussed. The first type of embodiment is one in which the line-of-sight technique uses a radiation source located with the recording subject. For example, with reference to FIG. 5, the recording subject may wear a helmet having a light source affixed thereto. In the second type of embodiment, the line-of-sight technique is based on image recognition. While these line-of-sight technologies are described herein with respect to the preferred embodiments hereof, it should be understood that the systems and methods of the present invention may include line-of-sight technologies other than light detection and image recognition. Line of sight technology may also be practiced using sound waves. The detection of the orientation of sound waves may be done using a plurality of microphones. Instead of the variations of intensity used to detect optical signal direction, the detection of sound waves may use differences in travel time to reach microphones positioned at a distance from one another. In a preferred embodiment the sound source is modulated and the phases of signals arriving at different microphones are evaluated. In a preferred embodiment sound frequencies that do not interfere with human and animal life (e.g., ultrasound) are preferably used. Other preferred embodiments are also described and contemplated throughout the following discussion and form a part of the invention hereof.

The distance between the camera and the subject is referred to as the working distance of the system. Some line of sight technologies (in particular infrared radiation based technology) are limited to short working distances (about one to about 10 meters). Global positioning based orientation is more accurate at larger working distances (beyond 10 meters). The systems and methods of the present invention combine these technologies so that the automatic video recording system will track the subject as discussed further herein.

To assist in the discussion hereof, reference should be made to co-owned and co-pending U.S. patent application Ser. No. 13/726,203, titled "A PORTABLE SYSTEM FOR HIGH QUALITY AUTOMATED VIDEO RECORDING" (hereinafter referred to as the '203 patent application), and co-owned and co-pending U.S. patent application Ser. No. 13/726,222, titled "SYSTEM AND METHOD FOR INITIAL SETUP OF AN AUTOMATIC RECORDING SYSTEM" (hereinafter referred to as the '222 patent application). The '203 patent application and the '222 patent application are hereby incorporated by reference herein in their entirety.

FIG. 1 shows a schematic diagram illustrating a first embodiment of the automatic video recording system according to a preferred embodiment of the present invention. FIG. 1 shows automatic video recording system 10. Automatic video recording system 10 is configured to track and record subject 12, such as a participant in a sporting event. In the illustrated embodiment, automated video recording system 10 comprises remote device 16 and camera orientation control device 70. Remote device 16 is collocated with subject 12, as shown. Remote device 16 is preferably worn by subject 12. Camera 46 is attached to camera orientation control device 70, as shown. Camera orientation control device 70 keeps camera 46 pointed at remote device 16 and subject 12. The pointing direction of camera 46 is the direction of the optical axis of camera 46. The zoom of camera 46 is preferably set such that subject 12 is within field of view 60 of camera 46. The focus of camera 46 is preferably set so that subject 12 is appropriately in focus. The zoom and focus of camera 46 may either be fixed during the duration of the recording or automatically adjusted as discussed further below.

Remote device 16 is preferably equipped with one or more sources of electromagnetic radiation 50 detectable by a variety of appropriate sensors incorporated in orientation control device 70. For example, electromagnetic radiation in the radio wave portion of the electromagnetic spectrum is used to transmit data between remote device 16 and camera orientation control device 70. As shown in FIG. 1, antenna 71 is associated with orientation control device 70. Antenna 71 transmits and detects radio waves from remote device 16.

Electromagnetic radiation in the infrared or visible light range of the electromagnetic spectrum may also be used for target orientation. For example, a four-segmented detector of infrared radiation may be associated with camera orientation control device 70 and a corresponding infrared radiation emitter may be associated with remote device 16. Appropriate filtering may be needed to make the detection work in the presence of background radiation, such as sunlight and common heat sources. Visible light may also be used. In such an embodiment, a light-emitting device is associated with either remote device 16 or with subject 12. The camera itself or a separate position sensitive detector, such as a charge coupled device (CCD), channel plate, or the like, is associated with camera orientation control device 70.

In the embodiment shown in FIG. 1, camera 46 is attached to camera orientation control device 70 which preferably comprises a pan drive and a tilt drive to pan and tilt camera 46. Camera orientation control device 70 further preferably comprises at least one microprocessor and one or more communication devices. A global positioning antenna associated with remote device 16 receives signal from satellites and/or terrestrial sources. In some embodiments of the system shown in FIG. 1, camera orientation control device 70 is not equipped with a global positioning device and its location is determined by a procedure during which remote device 16 is temporarily placed near camera orientation control device 70 (for a more detailed discussion of this procedure refer to the above-referenced '222 patent application). In a preferred embodiment, camera orientation control device 70 is itself equipped with a global positioning unit. Thus, the positions of both remote device 16 and camera orientation control device 70 may be known if global positioning signals are appropriately received. In such a preferred embodiment, so long as an initial orientation of camera 46 is known, there is sufficient information for orienting the camera at remote device 16 using global positioning technology.

The initial orientation of camera 46 is preferably determined through a set up procedure or using internal orientation sensors (for details refer to the '222 patent application and the '203 patent application referenced above).

In the embodiment shown in FIG. 1, camera orientation control device 70 is mounted on tripod 34. Tripod 34 preferably comprises an elevating mast 36 for height adjustment purposes. When mounted on tripod 34, camera 46 of automatic video recording system 10 is stationary during a recording session, as shown in FIG. 1. Automatic recording system 10 is preferably sized appropriately to be portable to the filming location.

In other preferred embodiments, camera 46 may not be stationary during a recording session. For example, camera orientation control device 70 and camera 46 may be mounted on a mobile platform (e.g., a car). In such an embodiment camera orientation control device 70 is preferably collocated with camera 46, and camera orientation control device 70 has a location sensor (such as a global positioning sensor) to keep track of the location of camera 46 as the camera moves. In addition, one or more other sensors, for example, roll and pitch sensors and/or electronic compasses, to name a few, may be employed to update the orientation of the camera due to orientation changes experienced by the camera by being situated on a moving platform. In certain embodiments, one or more orientation sensors may be used to determine the orientation of the camera or the camera orientation control device.

As the subject moves, the global positioning sensors determine the locations of remote device 16 and camera orientation control device 70. With reference to the '203 patent application, the new desired orientation angle of camera 46 is calculated such that camera 46 will be oriented to keep remote device 16 and collocated subject 12 within field of view 60 of camera 46. Camera orientation control device 70 provides commands for associated pan and tilt motors (see, e.g., FIG. 5 and related discussion of the '203 patent application) regarding the desired turning angle and turning velocity. The orientation of camera 46 is known during the remainder of the recording session preferably by keeping track of camera movements using, for example, encoded wheels and tracking stripes of the encoded wheel. In a preferred embodiment hereof, camera orientation control device 70 also outputs commands to camera 46 for automatic focus, automatic zoom, recording on, recording off, power on, and power off.

Figure 2:
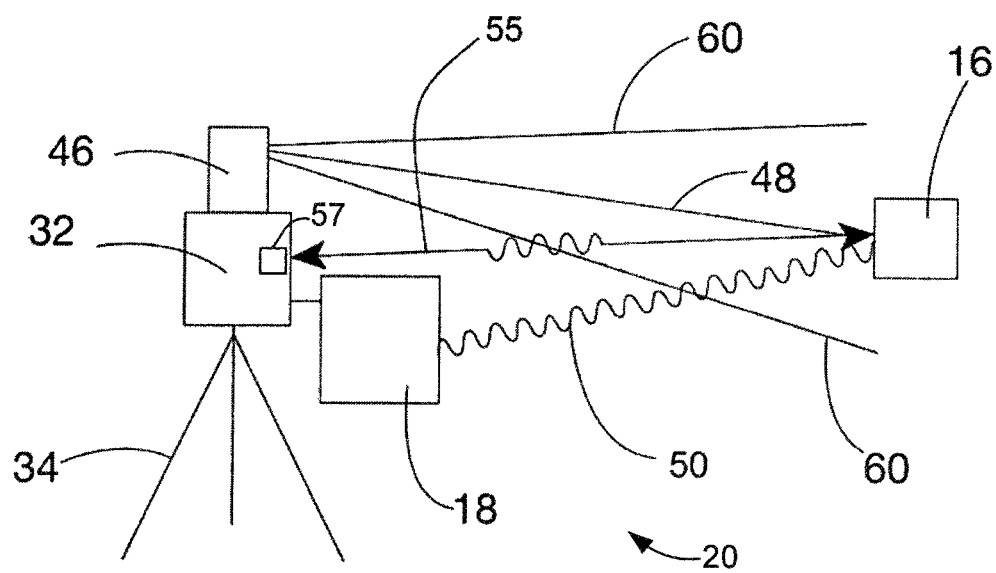
FIG. 2 shows a schematic diagram illustrating a second embodiment of an automatic video recording system according to a preferred embodiment of the present invention.

FIG. 2 shows a schematic diagram illustrating a second embodiment of the automatic video recording system according to a preferred embodiment of the present invention. In the embodiment illustrated in FIG. 2, automatic video recording system 20 comprises camera 46, positioner 32, tripod 34, base station 18, and remote device 16. Camera 46 is connected with positioner 32 which functions to change the position of camera 46 to track remote device 16 associated with the subject being recorded. Positioner 32 is shown attached to tripod 34. Base station 18 is the unit of automatic video recording system 20 that processes information transmitted from remote device 16 and from radiation sensor 57 associated with positioner 32 and communicates commands to positioner 32 to orient camera 46 to point at remote device 16. Base station 18 is physically separate from positioner 32, but is communicatively coupled with positioner 32. Upon receiving commands from base station 18, positioner 32 orients camera 46 to stay pointed at remote device 16 as remote device 16 moves in the environment. The embodiment of FIG. 2 differs from the embodiment shown in FIG. 1 in that the embodiment of FIG. 2 illustrates physical separation of the camera orientation control function and the positioner function of the automatic video recording system 20. In FIG. 1, these functions are carried out by camera orientation control device 70. It is noted that any of the functions of base station 18 described below may also be carried out by the camera orientation control device 70 of FIG. 1 (except for those functions that are expressly related to the physical separation of positioner 32 and base station 18).

Referring again to FIG. 2, remote device 16 and base station 18 are communicatively coupled (such as, for example, by radio communication 50). In addition to the aforementioned radio communication, remote device 16 preferably emits radiation 55 detected by radiation sensor 57. In FIG. 2, radiation sensor 57 is shown associated with positioner 32, but it may also be associated with camera 46, tripod 34, etc. Radiation sensor 57 is preferably incorporated with positioner 32. Emitted radiation 55 may be ultrasound, infrared, or visible light; radiation sensor 57 corresponds to the type of radiation emitted by remote device 16. Camera 46 is oriented at remote device 16 using a combination of global positioning technology and line-of-sight technology as discussed further herein.

It is noted that the location of camera 46 may also be determined by employing line-of-sight technology. Combining global positioning location determination with line-of-sight technology can assist in reducing the location uncertainty inherent in global positioning technology as discussed with respect to FIG. 3 below.

Figure 3:
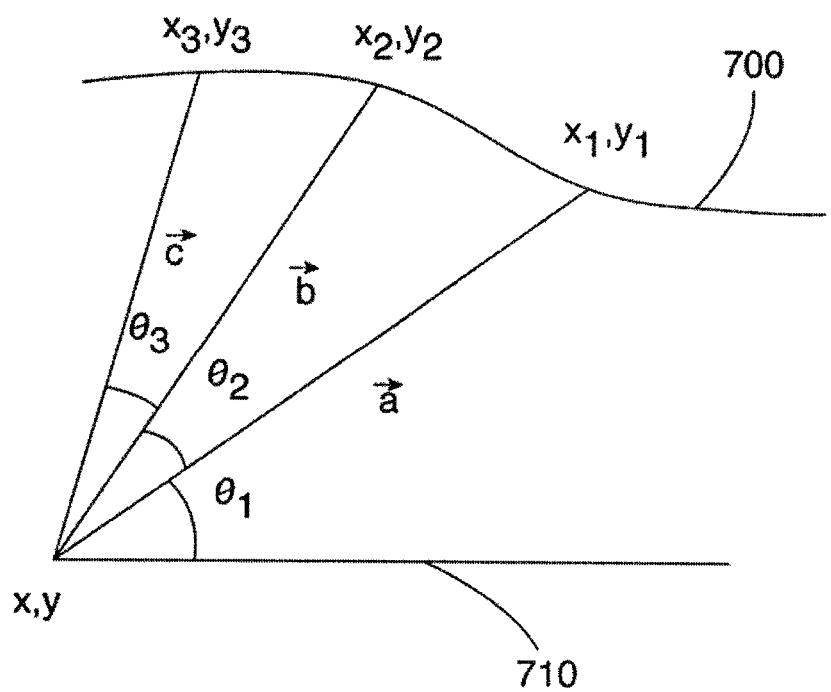
FIG. 3 shows a graphical depiction illustrating location determination of a camera and an associated camera orientation control device according to a preferred embodiment of the present invention.

FIG. 3 shows a graphical depiction illustrating location determination of a camera and an associated camera orientation control device according to a preferred embodiment of the present invention. In FIG. 3, camera 46 and camera orientation control device 70 are located at point (x,y). The movement of remote device 16 is depicted as moving along path 700. A radiation source, such as a light source, is preferably located on remote device 16. A radiation sensor is preferably associated with camera orientation control device 70 or camera 46. The radiation sensor is preferably an orientation sensitive detector. In most uses, remote device 16 is worn by a person and will move freely in the environment. It should be noted that the remote device may be associated with a person, an animal, an inanimate object (such as a robot or a vehicle), a combination of the aforementioned, etc.

Camera 46 is oriented toward remote device 16 using location determination systems and methods based on global positioning technology (for a detailed discussion of such systems and methods, refer to the '203 patent application referenced above). As discussed in great detail in the '203 patent application, the directional angles of camera 46 are referenced to an initial direction determined in a setup or initialization procedure. The initial direction is referenced in FIG. 3 as initial direction 710. To combine the global positioning methodology with a line-of-sight methodology to refine the location determination of the camera/camera orientation control device, the locations of remote device 16 along path 700 of the subject at various times are determined by a global positioning methodology (see '203 patent application). The line-of-sight sensors preferably have one or more associated clocks. Additionally, the global positioning sensors preferably comprise one or more associated clocks as well. The clock or clocks of the line-of-sight sensors are preferably synchronized with the clock or clocks of the global positioning device.

Referring to FIG. 3, the angles $\theta_2$ and $\theta_3$ are determined by a line-of-sight method and the corresponding locations $(x_1,y_1)$, $(x_2,y_2)$ and $(x_3,y_3)$ are known from global positioning data. With this information, x and y can be calculated. Using the vectors $\vec{a}, \vec{b}, \vec{c}$, the equations may be written as $$\cos\theta_2 = \frac{\vec{a}\cdot\vec{b}}{ab}$$

and $$\cos\theta_3 = \frac{\vec{b}\cdot\vec{c}}{bc},$$

where the angles and the differences between the vectors are known.

Stated another way, one can write the equations to calculate the location of the camera/camera orientation control device as follows: (1) $\tan\theta_1=(y_1-y)/(x_1-x)$, (2) $\tan(\theta_1+\theta_2)=(y_2-y)/(x_2-x)$, and (3) $\tan(\theta_1+\theta_2+\theta_3)=(y_3-y)/(x_3-x)$. The values for $\theta_2$ and $\theta_3$ are known from the line of sight method. The values of $x_1$, $x_2$, $x_3$, $y_1$, $y_2$, and $y_3$ are known from the global positioning method. With these values, the location (x,y) may be determined.

Those skilled in the art will recognize that while FIG. 3 and the equations as written depict and describe 2-dimensional movement, the same principles apply to 3-dimensional movement of the subject. The equations may be adapted to accommodate 3-dimensional movement.

The calculation of x and y is preferably repeated every time both global positioning and line-of-sight data for the same location of remote device 16 are available. The determination of the location (x,y) is continually improved over time by computing averages of the determined locations of (x,y). The improved camera location may then be used in the global positioning method for improved tracking of the subject 12.

Figure 4:
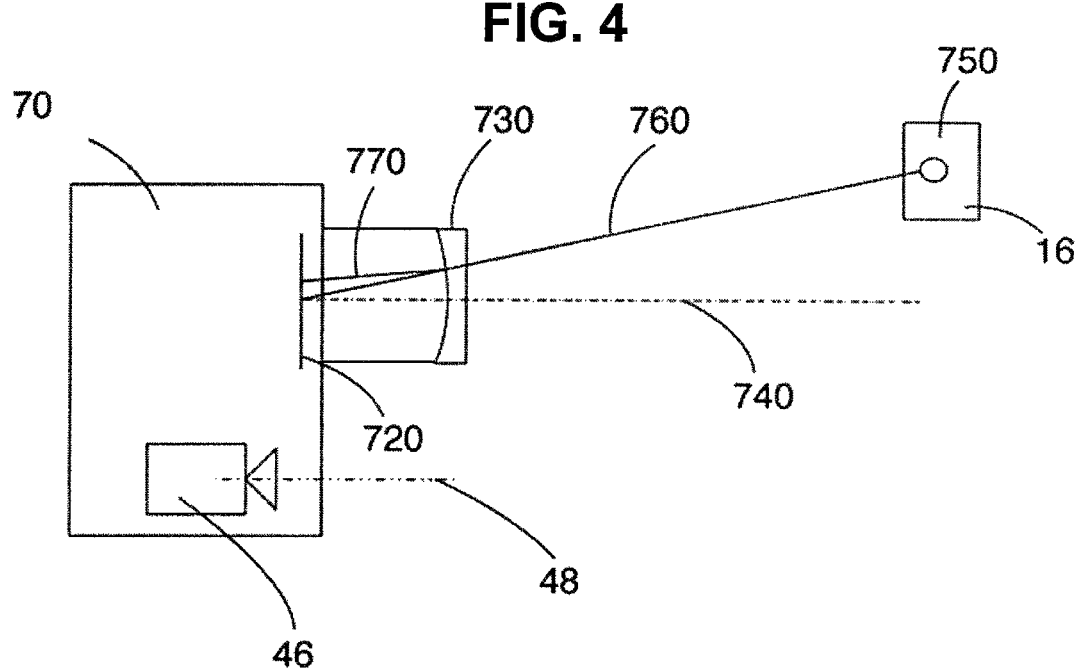
FIG. 4 shows a schematic diagram illustrating a line-of sight direction detection system of an automatic video recording system according to a preferred embodiment of the present invention.

FIG. 4 shows a schematic diagram illustrating a line-of sight direction detection system of an automatic video recording system according to a preferred embodiment of the present invention.

FIG. 4 shows camera orientation control device 70 with associated camera 46. Remote device 16 comprises an associated radiation emitter, namely, light source 750. Camera orientation control device 70 is preferably equipped with position sensitive detector 720 and with appropriate optics 730, as shown. In FIG. 4, optics 730 is depicted as a concave lens.

Position sensitive detector 720 and camera 46 are preferably oriented together (i.e., optical axis 740 of position sensitive detector 720 is parallel to optical axis 48 of camera 46). Light source 750 of remote device 16 emits an appropriately modulated light beam 760. Light beam 760 is refracted by optics 730 and is detected, in the example shown in FIG. 4, off center as beam 770. Light beam 770 is detected off center because remote device 16/light source 750 is not situated along optical axis 740. It is noted that for illustration purposes the axes 48 and 740 are shown well separated, while the distance between camera 46 and remote device 16 is very much reduced. In reality, axes 48 and 740 will preferably essentially coincide; the distance between them is about at least 100 times smaller than the distance from camera 46 to remote device 16.

Position sensitive detector 720 is preferably connected to a microcontroller housed within camera orientation control device 70. Position sensitive detector 720 communicates with camera orientation control device 70 to turn camera 46 and optics 730 of position sensitive detector 720 so that light beam 750 is detected at the center of detector 720 along optical axis 740. If light beam 760 is detected at the center of detector 720 along optical axis 740, camera orientation control device 70 and its associated components (camera 46) are not turned.

FIG. 4 depicts optics 730 as a single concave lens; such a depiction is for illustrative purposes only as optics 730 may be implemented in a number of ways as those familiar with designing optics will recognize.

In a preferred embodiment, light beam 760 is in the infrared wavelength range of the electromagnetic spectrum and has a well-defined wavelength. Appropriate filtering ensures that background infrared radiation does not produce detection errors. Using infrared radiation is advantageous in that interference from background radiation is avoided. Use of infrared radiation does, however, have limited working distance. Alternatively, visible light position detection methods may be used which include using multiple or segmented detectors and turning the detector (or detector array) such that the light intensity is balanced.

In another embodiment, the position of remote device 16 relative to camera 46 may be determined by incorporating an array of two or more directional antennae and/or microphones located at camera 46. The array of two or more directional antennae and/or microphones are capable of being oriented together in different directions. In such an embodiment, the direction and/or the distance of the remote device is determined based on the relative strengths of the electromagnetic or sound wave signals transmitted by remote device 16 and received by receiving devices located at camera 46. Additionally, in the case of use of sound waves, by having a known emitted frequency, the Doppler shift may be detected and used to determine if remote device 16 is moving closer or farther from camera 46. Further, the velocity of that movement may be determined as well.

In an alternative embodiment, light source 750 emits visible light and the light intensity of beam 760 is modulated using an electro-optical device. The visible light signal in such an embodiment may be detected even in the presence of strong but un-modulated background light (such as sunshine) by applying phase detection technology. The advantage of such a system is increased working distance, while the disadvantage is a time delay associated with the phase detection technology.

The systems and methods of the present invention may also use line-of-sight technology using ultrasonic transceivers. In such an embodiment, ultrasound may be used much like the light-based methods described above. The ultrasound source signal is preferably integrated with the remote device. A detector array (a segmented detector) is preferably used to detect ultrasound signals and to determine the orientation of the source with respect to the detector array.

Equipment combining line-of-sight and global positioning technologies must take working distance limitations into consideration. One of the limitations of the line-of-sight technology as practiced, for example, using infrared radiation light, is its limited working distance due to absorption of infrared radiation light in air. "Long range" infrared radiation communication permits working distances between 10 meters and 100 meters. However, with most consumer-priced readily available infrared-based line-of-sight technologies, even a 10-meter working distance would be difficult to achieve. Because of similar reasons of absorption in air, ultrasonic location determination is limited to working distances of less than 10 meters using most ultrasonic transceivers available today. High power ultrasonic transmitters exist that, under optimal air conditions (low particulate concentration), work up to 100-meter distances; however, due to power consumption and size they are not applicable for the consumer applications of the present invention. (It should be noted that such devices could be used for location determination indoors replacing global positioning location determination when the emitters are installed at fixed locations, such as on poles or walls in corners of an arena). Due to the uncertainty in the location determination using commonly available low cost global positioning technology, location determination using a global positioning based methodology is limited to working distances longer than about 10 meters. Combining the line of sight methodology described herein with the global positioning methodology, an automatic video recording system will work both at short distances of about one to 10 meters, as well as long distances of about 10 to 1000 meters.

In use, it is noted that the subject may move in and out of the infrared range during a given recording session. As a general method, the system preferably uses the line-of-sight method when available, and global positioning technology is used alone (without line-of-sight input) when the distance or other factors prevent use of line-of-sight methodologies. Accordingly, in a preferred embodiment of the present invention, the system is programmed to use the line-of-sight methodology at short distances and the global positioning methodology when available and when the working distance is longer.

The reach of light based line-of-sight methods may be extended by using visible light instead of infrared radiation light. An additional technique for locating and tracking a remote device preferably utilizes electromagnetic frequency sensors (e.g., a charge-coupled device), which detects an electromagnetic wave emitted by the remote device. For example, a lens is positioned to face in the general direction of the remote device. The electromagnetic wave emitted by the remote device has a specific frequency. The lens allows the electromagnetic waves emitted by the remote device to pass through and project onto a charge coupled device. Filters are preferably put in place to block out frequencies not emitted by the remote device. The charge coupled device is preferably optimized to detect one or more frequencies that are emitted by the remote device. By knowing the position of the projection of the electromagnetic source on the charge-couple device, the relative direction of the remote device can be determined. In this version of the tracking system, the lens/charge coupled device sensor is preferably located on the positioner 32.

Both electromagnetic and sound signals may be emitted from sources in the remote device. However, the signal sources may also be separate from the remote device as well.

Figure 5:
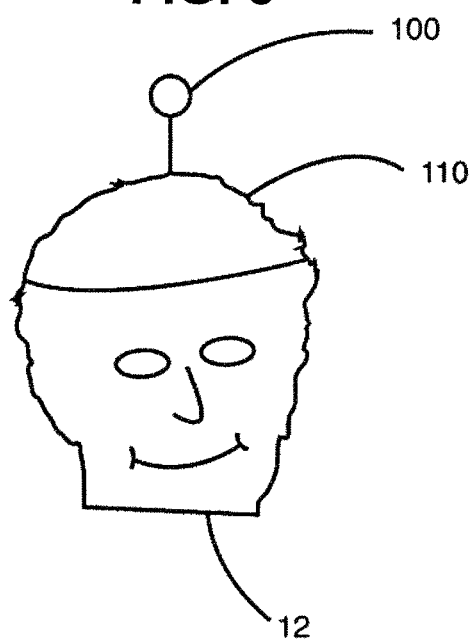
FIG. 5 shows a schematic diagram illustrating a radiation source wearable by a subject according to a preferred embodiment of the present invention.

FIG. 5 shows a schematic diagram illustrating a radiation source wearable by a subject according to a preferred embodiment of the present invention.

According to a preferred embodiment hereof, both electromagnetic and sound signals may be emitted from sources in the remote device but these sources also may be separate from the remote device that serves global positioning reception and transmission. In a preferred embodiment, shown in FIG. 5, a light source 100 (i.e., a radiation source) for line of sight orientation is preferably connected to helmet 110 worn by subject 12. In other embodiments helmet 110 may be replaced by a headband, or similar device. For convenience, radiation emitted from a device collocated with the subject will be referred to as being emitted from the remote device; however, the emission may actually originate from a separate device such as the helmet-mounted light source 100 depicted in FIG. 5. The helmet or other worn device may further include a global positioning unit and/or a camera for point-of-view recording.

It is noted that a signal originating from the remote device may be sensed by a plurality of sensors or antennas. The sensors or antennas may be substantially collocated with camera 46 or may be at a separate location and may communicate with camera orientation control device 70 or base station 18.

Figure 6:
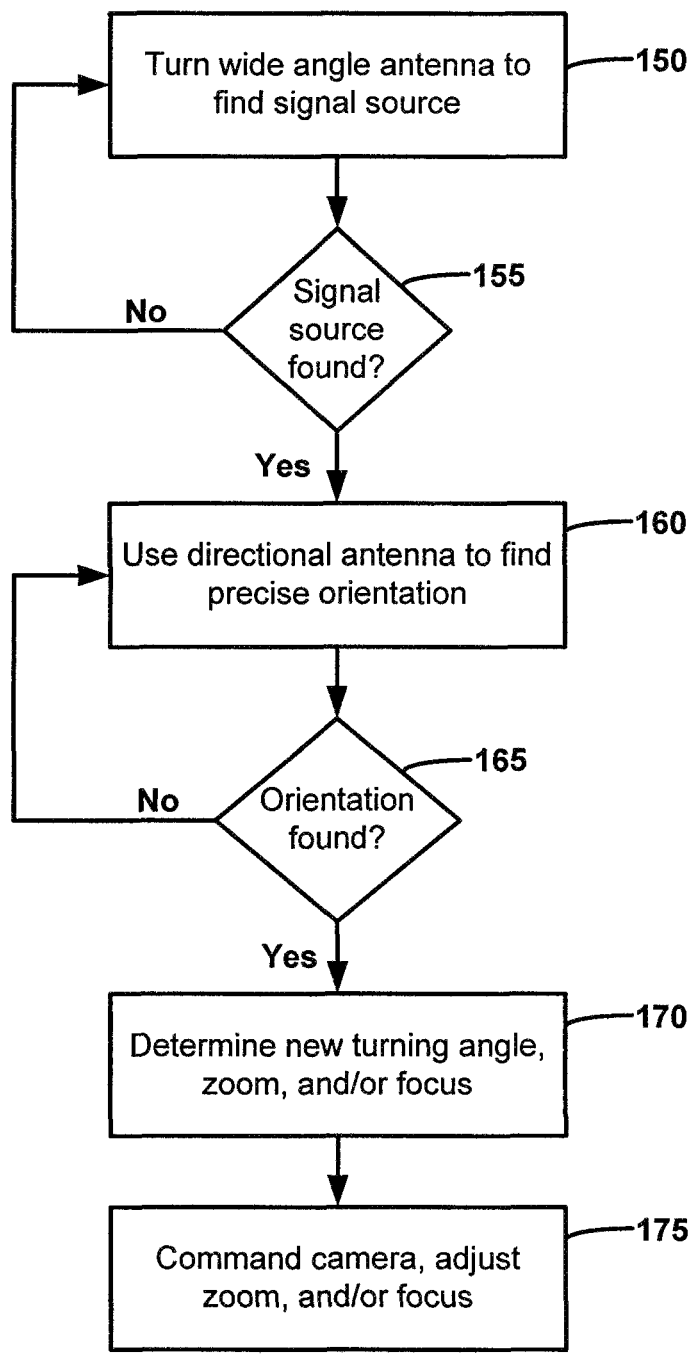
FIG. 6 shows a flowchart illustrating a method of orienting a camera according to a preferred embodiment of the present invention.

FIG. 6 shows a flowchart illustrating a method of orienting a camera according to a preferred embodiment of the present invention. More particularly, FIG. 6 shows a line of sight methodology to point a camera at a desired subject using at least two directional antennas. In a preferred embodiment, a wide-angle antenna turns searching for an electromagnetic signal associated with a subject (the signal source) in step 150. A wide-angle antenna is preferred in step 150 to provide a greater chance of finding the electromagnetic signal associated with the subject. Subsequently in step 155, the system determines whether the electromagnetic signal associated with the subject has been located and further determines its approximate direction. Next, in step 160, a second narrower directional antenna is used to find a more precise orientation from which the electromagnetic signal comes. If a more precise orientation is found in step 165, then camera orientation control device 70 (or base station 18) determines whether to change the orientation of the camera, the zoom, and/or the focus of camera in step 170. The appropriate signals are sent to an associated pan and tilt motor to orient the camera to point at the electromagnetic signal source, to adjust the zoom of the camera, and/or to adjust the focus of the camera in step 175. The zoom and focus commands for camera 46 require determining the distance and velocity of the subject; these may be determined either from global positioning data or from electromagnetic signal intensity.

Figure 7:
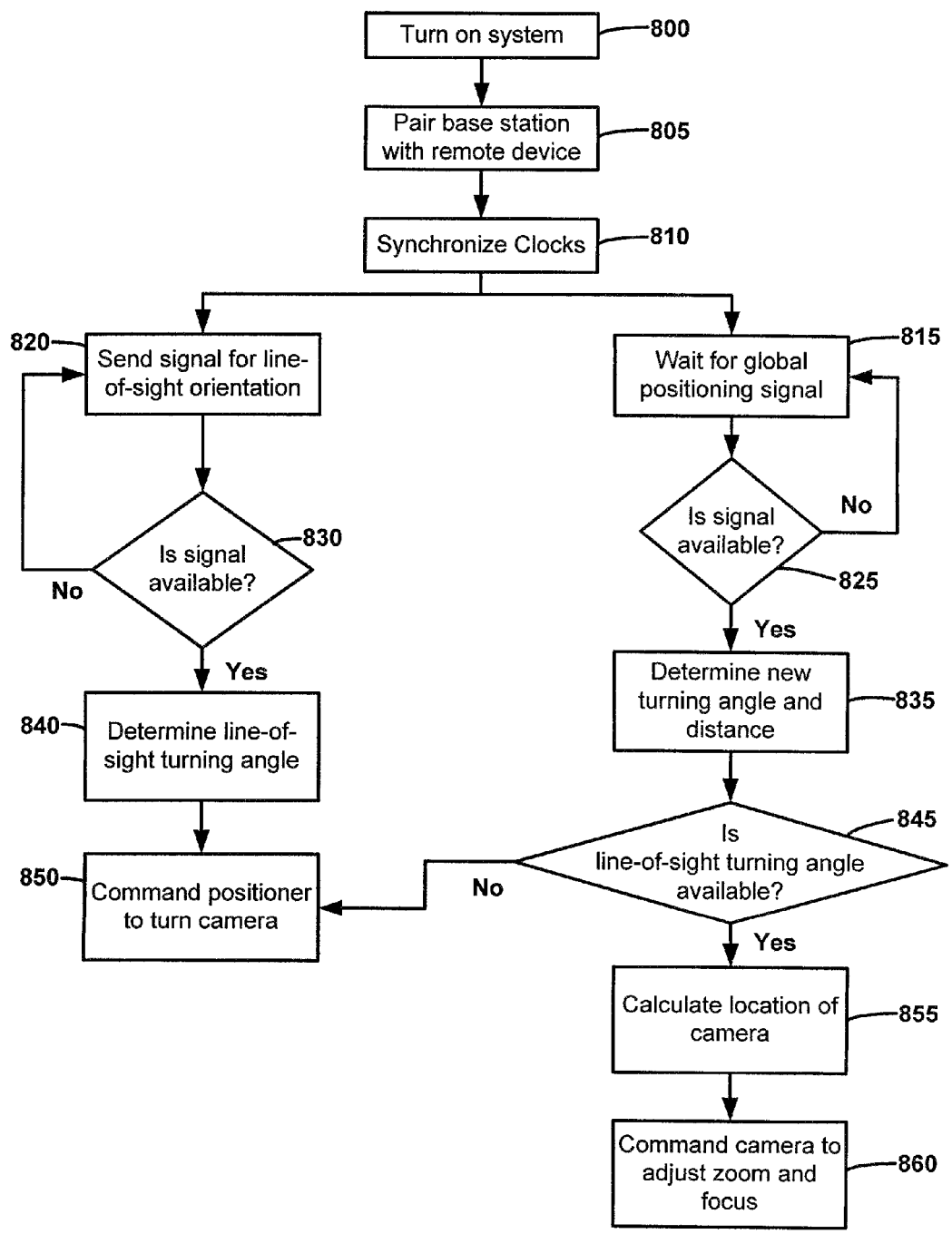
FIG. 7 shows a flowchart illustrating another method of orienting a camera according to a preferred embodiment of the present invention.

FIG. 7 shows a flowchart illustrating another method of orienting a camera according to a preferred embodiment of the present invention. In step 800, the automatic video recording system is powered on. In step 805, the remote device 16 and base station 18 are paired. In other words, unique communication is established between remote device 16 and base station 18. Such communication is distinguishable from communication between similar elements of another system. The pairing is performed to avoid problems when multiple copies of the apparatus are used in the same vicinity. The pairing step 805 also preferably includes choosing a unique modulation frequency for a radiation signal to be used for line-of-sight orientation determination. As discussed above, the radiation signal may be infrared radiation, visible light, or ultrasound. The pairing is preferably valid for the duration of the recording session. The same base station 18 may be paired with different remote devices 16 for different sessions. Also, in embodiments where a single camera films multiple subjects each having a remote device, each remote device is preferably paired with the same base station 18.

In step 810 the clocks of base station 18 and remote device 16 (or of multiple remote devices) are synchronized. Next, in step 820, the line of sight signal for orientation determination is sent from remote device 16. Next, the system determines whether the line of sight signal is available for orientation in step 830. If a line of sight signal is detected in step 830, then a line-of-sight turning angle for camera 46 is determined by base station 18 in step 840. Next, positioner 32 is commanded to turn camera 46 accordingly in step 850. If a line of sight signal is not detected in step 830, then step 820 is repeated until such a signal is detected. During substantially the same time as the above-described steps 820, 830, and 840 relating to the line of sight method, in a parallel path the global positioning antenna of remote device 16 waits ready to receive global positioning signal in step 815. If such a signal is received in step 825, the location of remote device 16 is determined and a new turning angle for camera 46 is determined in step 835 (for a detailed discussion of the global positioning methodology, refer to the '203 patent application). If at the same time, a line of sight turning angle is determined and available in step 845, the information determined in step 835 may be combined with information determined in step 840. With such information, the location of camera 46 may be determined in step 855. To successfully complete step 855, a set of three data pairs are needed (see FIG. 3). Thus, the line of sight technique must be active long enough to generate a set of data comprising at least three data pairs before step 855 can be carried out. After the set of three data pairs is determined, the calculations of step 855 are carried out every time new synchronized data of remote device locations and camera angles are available. Once determined, the location data for the camera 46 is stored. If a line of sight turning angle is not available, the system uses the turning angle determined in step 835 to control the orientation of camera 46. In addition, the distance between camera 46 and remote device 16 determined in step 835 is used to control the zoom and focus of the camera 46 in step 860.

Steps 815 and 820 and their subsequent steps are repeated until the system is turned off at the end of the recording session.

When remote device 16 and the camera 46 are located such that the line-of-sight methodology can be employed, the orientation of camera 46 is preferably controlled by the line-of-sight methodology. When the line of sight method cannot be employed for any reason, the global positioning based control takes over. For example, at the beginning of the recording the subject 12 may be in close proximity to the camera 46. When in close proximity, the line-of-sight methodology is employed. If subject 12 moves farther away from camera 46 to a distance that is too far for the line-of-sight technique to operate, the global positioning based camera orientation controls. If subject 12 moves in and out of the acceptable range of the line of sight technique, the control of the system switches between line-of-sight and global positioning based control as needed.

In those embodiments where a global positioning antenna is collocated with camera 46, the differential global positioning method may be employed. In such a case, the precision of the determination of the relative locations of camera 46 and remote device 16 is improved and step 855 of FIG. 7 may be omitted.

In another embodiment of the invention, line-of-sight technology may be used to correct camera location data. Using the distance between camera 46 and remote device 16 determined by differential global positioning, one may calculate corrections for the location coordinates x and y of the camera using the equations: $\Delta x = d(\cos\alpha - \cos\beta)$ and $\Delta y = d(\sin\alpha - \sin\beta)$, where d is the distance between the camera and the remote device, where $\alpha$ and $\beta$ are the angular positions of the camera determined by the line-of-sight and global-positioning-based methods, respectively, at the same time. The corrections are preferably continually updated.

In another embodiment, the distance between remote device 16 and camera 46 is determined using a brightness or intensity measurement. If the brightness of an electromagnetic radiation source and its emission profile are known, the brightness measured at a particular distance depends only on the absorbance of the medium between the source and sensor and the distance between them. The absorbance may be assumed to be negligible (as in clean air), corrected for mist, or may be measured using auxiliary equipment.

Figure 8:
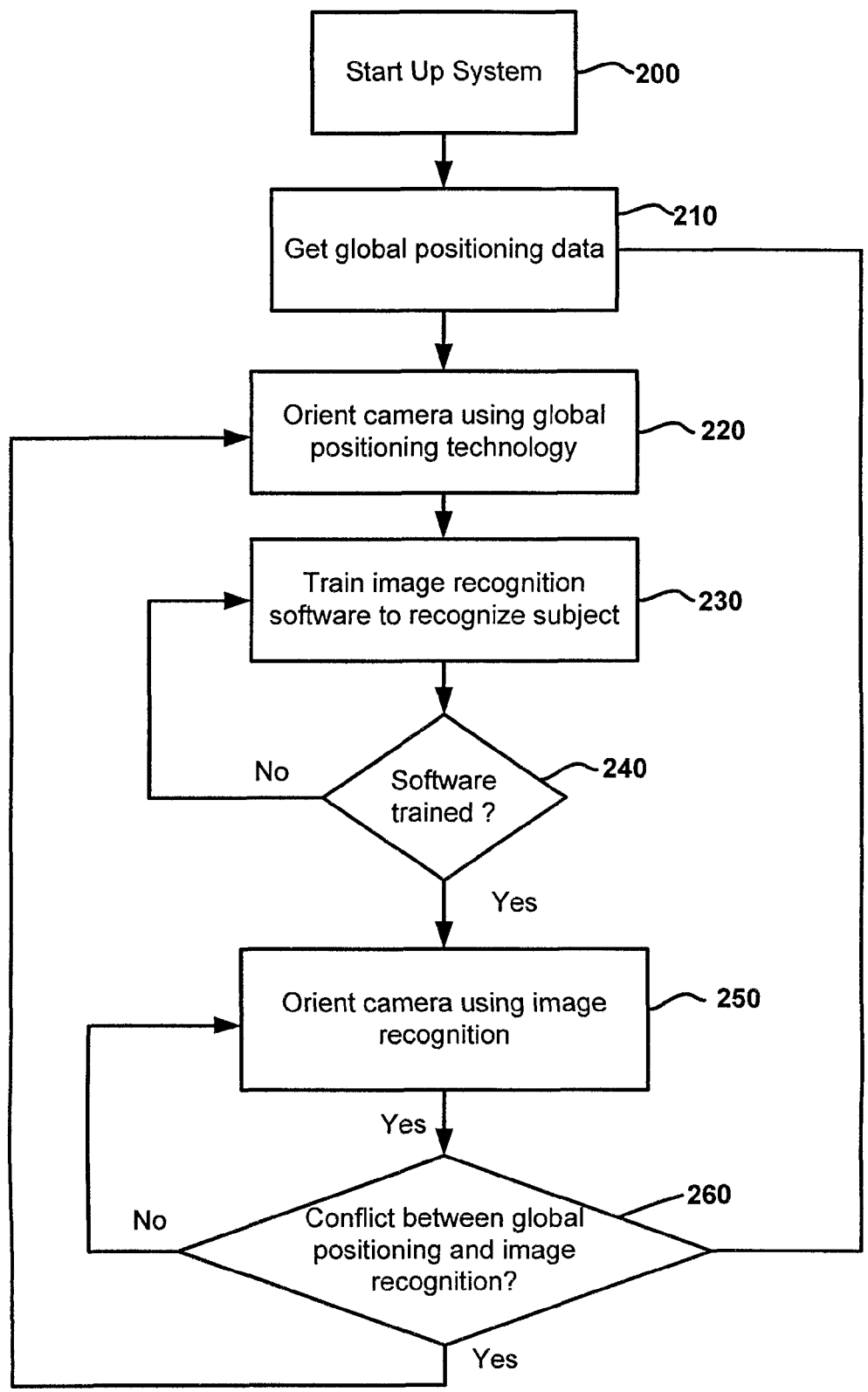
FIG. 8 shows a flowchart illustrating another method of orienting a camera according to a preferred embodiment of the present invention.

FIG. 8 shows a flowchart illustrating another method of orienting a camera according to a preferred embodiment of the present invention. More particularly, FIG. 8 shows a flowchart illustrating a method of orienting a pointing device using both global positioning and line-of-sight technology wherein the line-of-sight technology comprises image recognition or shape recognition. The method of FIG. 8 may be carried out, for example, using a camera that is otherwise used for recording and by employing appropriate software solutions.

In step 200, the automatic video recording system is powered on or started. In step 220, the camera is oriented using global positioning data acquired in step system 210 (for details, refer to the '203 patent application referenced above). Image recognition software is preferably employed and trained to recognize the subject in step 230. In step 240, the system determines whether or not subject recognition is sufficient. If the image recognition software is not sufficiently trained, step 230 repeats. Once the image recognition software is sufficiently trained and the subject is recognizable, subject recognition can serve as the basis of orienting the camera in step 250. Preferably, while image recognition is controlling the orientation of the camera, global positioning technology continues to be employed, although it does not control the orientation of the camera. The global positioning technology retains a correcting function that takes over in case of conflict in step 260. For example, if there are multiple similar images in the field of view (such as when filming surfing and multiple surfers are present in the same area), the camera might begin to orient toward a different surfer instead of subject 12. If the information from global positioning technology contradicts the image recognition, the global positioning methodology takes over and corrects the orientation of camera 46 and returns to step 220. Next, the image recognition software is again trained to recognize subject 12 in step 230 and the process repeats until filming is done.

One of the advantages of the method of FIG. 8 is that the distance limitations of the global positioning technology need not apply to a system working with the combination of image recognition and global positioning technologies.

Image recognition technology may be advantageously supplemented by other location detection technology, such as global positioning or infrared-radiation-based line-of-sight methods. By supplementing with a second location detection technology, the image recognition system can "learn" the image of the subject to be tracked. Once a series of images are collected using the supplemented location detection technology and the system learns to recognize the subject, tracking of the subject continues based on the image recognition information alone or by a combination of the image recognition information and the supplemented location detection technology.

There is a certain freedom in designing the system in the way conflict of step 260 is defined. It may allow for several conflicting data points about the correct camera orientation to be obtained before the existence of conflict is actually acknowledged.

As discussed above, camera 46 may be in motion during a recording session. In such an embodiment, base station 18 "knows" the location and orientation of camera 46 in real time. This is accomplished by one of several possible methods, or by a combination of methods. One such method is that camera 46, or positioner 32, has one or more built in devices that provides such information. These devices may include a global positioning unit, an accelerometer, a gyroscope, an electronic level, an elevation sensor, an electronic compass, and the like. Another method is to have a known track or path for camera 46 along which it moves (e.g., a rail wherein the camera moves at a constant speed). Yet another method is moving camera 46 by a device programmed to move on a predetermined track and with predetermined velocity. Alternatively, base station 18 receives information regarding camera position and orientation from prepositioned units along a track sending electromagnetic or sound signals from known locations. In these embodiments, base station 18 is capable of tracking subject 12. An example of such an embodiment is when camera 46 is located on the helmet of a snowboarder and automatically tracks other snowboarders who are wearing remote devices. Another example includes camera 46 attached to a moving vehicle which follows subject 12 (e.g., a cyclist or marathon runner). Another example includes camera 46 and camera orientation control device 70 positioned on a rail or track which runs along the sideline of a sport's field (e.g., a racetrack or golf course), along a down hill ski run, along a motocross venue, or within a movie of television production set. Camera orientation control device 70 and camera 46 move along the track either (i) according to the way a person in charge of the recording sees fit, or (ii) automatically, based on the position of the tracked object or objects, or (iii) based on a predetermined algorithm.

It is noted that the camera orientation control device 70 may be used with devices other than a camera.

Different preferred embodiments, methods, applications, advantages, and features of this invention have been described above; however, these particular embodiments, methods, applications, advantages, and features should not be construed as being the only ones that constitute the practice of the invention. Indeed, it is understood that the broadest scope of this invention includes modifications. Further, many other applications and advantages of applicant's invention will be apparent to those skilled in the art from the above descriptions and the below claims.

What is claimed is:

1. A system for automatically orienting a camera at a target, said system comprising:
    a global positioning device associated with said camera to determine the location of the camera;
    a global positioning device associated with said target to determine the location of the target;
    an orienting device that orients said camera at said target based on location information generated by said global positioning devices associated with said camera and said global positioning device associated with said target; and
    said system for orienting said camera receives images from said camera and is trained using the received images to recognize said target, and, once trained, said orienting device uses image recognition of said target to orient said camera at said target.

2. The system of claim 1, further comprising at least one microelectromechanical device connected to said orienting device and used to determine the orientation of said camera.

3. The system of claim 1, further comprising at least one microelectromechanical device connected to said camera and used to determine the orientation of said camera.

4. A method of pointing a camera at a target, said method comprising:
    at least one first combination of steps and at least one second combination of steps, wherein the at least one first combination of steps comprises the steps of
        determining a location and an orientation of the camera;
        determining a location of the target;
        determining a direction and a distance between the camera and the target;
        periodically determining changes in the location of the target;
        periodically determining changes in orientation of the camera that are necessary to point the camera towards the target;
        using an orientation controller to point the camera towards the target; and
    wherein the at least one second combination of steps comprises the steps of
        collecting images of the target;
        training image recognition software to recognize the target within a field of view of the camera;
        orienting the camera at the recognized target; and
    wherein the at least one first combination of steps is used whenever the target is not recognized within the field of view of the camera.

5. The method of claim 4, further comprising the step of zooming in on and zooming away from the target.

6. A method of pointing a camera at a moving target, said method comprising the steps of:
    determining locations of the camera and of the target using global positioning information;
    periodically repeating determining locations of the camera and of the target in real time using global positioning information;
    periodically determining directions between the camera and the target;
    determining an orientation of the camera;
    periodically repeating determining the orientation of the camera in real time;
    using image recognition software to determine characteristics of the target and storing the characteristics;
    using the stored characteristics of the target to point the camera at the target.

7. The method of claim 6, further comprising the step of periodically determining a distance between the camera and the target.

8. The method of claim 7, further comprising the step of focusing the camera on the target.

9. The method of claim 6, further comprising the steps of
    determining a difference between the direction between the camera and the target and the orientation of the camera substantially at the same time; and
    comparing the determined difference between the direction between the camera and the target and the orientation of the camera with a predetermined value, and pointing the camera at the direction between the camera and the target if the determined difference between the direction between the camera and the target and the orientation of the camera exceeds the predetermined value.

10. The method of claim 7, wherein the camera has a zoom function, further comprising the step of adjusting the zoom of the camera based on the distance between the camera and the target.

11. The system of claim 1 wherein location information generated by said global positioning devices is used to orient said camera whenever the target is not recognized using image recognition.

\* \* \* \* \*